United States Patent [19]

Berchowitz et al.

[11] Patent Number: 4,649,283

[45] Date of Patent: Mar. 10, 1987

[54] MULTI-PHASE LINEAR ALTERNATOR DRIVEN BY FREE-PISTON STIRLING ENGINE

[75] Inventors: David M. Berchowitz; Robert W. Redlich, both of Athens, Ohio

[73] Assignee: Sunpower, Inc., Athens, Ohio

[21] Appl. No.: 767,438

[22] Filed: Aug. 20, 1985

[51] Int. Cl.[4] .............................................. H02K 33/00

[52] U.S. Cl. ...................................... 290/1 R; 310/15; 60/518; 60/520

[58] Field of Search ............. 290/1 R; 310/15; 322/3, 322/7, 8, 93; 60/518, 520, 521; 62/6

[56] References Cited

U.S. PATENT DOCUMENTS

| | | | |
|---|---|---|---|
| 3,076,153 | 1/1963 | Rieckman et al. | 331/116 M |
| 3,105,153 | 9/1963 | James, Jr. | 310/15 X |
| 4,044,558 | 8/1977 | Benson | 60/520 |
| 4,345,437 | 8/1982 | Dineen | 60/521 |
| 4,350,012 | 9/1982 | Folsom et al. | 60/520 |
| 4,408,456 | 10/1983 | Rauch | 60/520 X |
| 4,454,426 | 6/1984 | Benson | 290/1 R |

OTHER PUBLICATIONS

"Magnetic Circuits and Transformers" by Members of the Staff of the Department of Electrical Engineering, Massachusetts Institute of Technology, 1943, published by the M.I.T. Press, (copy attached—of part), pp. 665–668.

*Primary Examiner*—Peter S. Wong
*Assistant Examiner*—Emanuel Todd Voeltz
*Attorney, Agent, or Firm*—Frank H. Foster

[57] ABSTRACT

A linear alternator capable of delivering multi-phase power and yet being driven by a free piston Stirling engine. The alternator has a permanent magnet mounted to the power piston of the free piston Stirling engine and an armature coil member mounted radially outwardly from the piston cylinder for generating one phase. A body, such as a second piston mounted in the same cylinder, is drivingly linked through a spring to be driven by the power piston. A second permanent magnet is mounted to the body and a second armature coil member is formed outwardly of the cylinder disposed outwardly from the body to provide the second phase. Proper design selection of the mass of the body and the spring constant of the spring, together with all other springs connected to the body, causes the body to be driven in phase quadrature with the power piston so that the voltage outputs of the two phases are in quadrature. The armature coils are provided with suitable taps and connected as a Tee so that balanced three phase power is available directly from the armature windings of the linear alternator.

11 Claims, 4 Drawing Figures

MULTI-PHASE LINEAR ALTERNATOR DRIVEN BY FREE-PISTON STIRLING ENGINE

TECHNICAL FIELD

This invention relates generally to a free-piston Stirling engine which is drivingly connected to a linear alternator to provide a compact and reliable source of electrical energy derived from heat energy. More particularly, this invention relates to improvements in the alternator structure making it capable of providing multi-phase output power, including both two phase and three phase, although the alternator is driven in reciprocation by a free-piston Stirling engine.

BACKGROUND ART

Many patents and other technical literature disclose systems and improvements in which AC electrical power is generated using a free-piston Stirling engine drivingly connected to a linear alternator. Typically, the alternator has an armature coil and a magnetic flux source, such as a permanent magnet. The flux source and the armature coil are magnetically linked and relatively reciprocate with respect to each other. Ordinarily, the flux source is mechanically linked to the piston of the free-piston Stirling engine for driving the flux source in linear reciprocation.

As is known to those skilled in the art, some electrical energy consuming devices can be designed to operate more efficiently or effectively with multi-phase power. Typically three phase electrical energy systems are used in which the well known wye and delta loads are connected to the three or four conductors of the three phase source. That source has three voltages each 120 degrees out of phase with the other two.

Although multi-phase power generation is common with rotating machines, we are aware of no linear alternator connected to a free-piston Stirling engine which has been able to provide multi-phase output power.

It is therefore an object of the present invention to provide multi-phase electrical power output from a linear alternator drivingly connected to a free-piston Stirling engine and to provide such multi-phase power in the least costly and most efficient manner.

BRIEF DISCLOSURE OF INVENTION

The present invention has a first armature coil member and a first magnetic flux source member, one of which is drivingly connected to the power piston. While they may be arranged in accordance with conventional principles, preferably a permanent magnet is mounted directly upon the power piston and the armature is positioned radially outwardly of it. A body having a substantial mass, such as an auxilliary piston, is also mounted for reciprocation, preferably, but not necessarily, in the same cylinder as the power piston. The body is drivingly linked through a spring to be driven by the power piston. The spring may be a gas spring comprising gas between the piston and the body or a mechanical spring. A second armature coil member and a second cooperating magnetic flux source are also provided. They are associated with the body in a manner similar to the association of the first armature coil member and first magnetic flux source member with the piston. Preferably a second, permanent magnet is mounted on the body and the second armature coil member is disposed outwardly of the body and is magnetically linked to the second magnet. The spring constant of the spring which drivingly links the body to the piston as well as the spring constant of any other effective springs connected to the body, such as a bounce space, are selected along with the mass of the body so that the natural frequency of oscillation, or resonance, of the body and effective spring is at or near the piston frequency. The body will oscillate in quadrature with the piston when it is driven by the piston. Thus, the piston-mounted magnet and its associated armature, along with the body-mounted magnet and its associated armature, each form an alternator and the two operate in quadrature.

The output from these two quadrature phases may be connected to conventional circuitry for converting two phase AC power to three phase AC power. Preferably, however, the two armature members are provided with taps and are connected as a Tee so that three phase output power is available directly from the armature coil members without the necessity of any additional phase conversion circuitry.

The principal advantage of the present invention is that multi-phase power is made available from a linear alternator driven by a free piston Stirling engine, thus obtaining the advantages of both the free piston Stirling engine and the availability of multi-phase power.

Another advantage of the present invention is that balanced three phase power is available directly from the two tapped armature windings of the linear alternator.

Yet another advantage of the present invention is that a linear alternator of the present invention not only is capable of producing multi-phase power but does so with optimally simple structures. The total size and weight being no larger than a single phase alternator of identical power.

Figure 1:
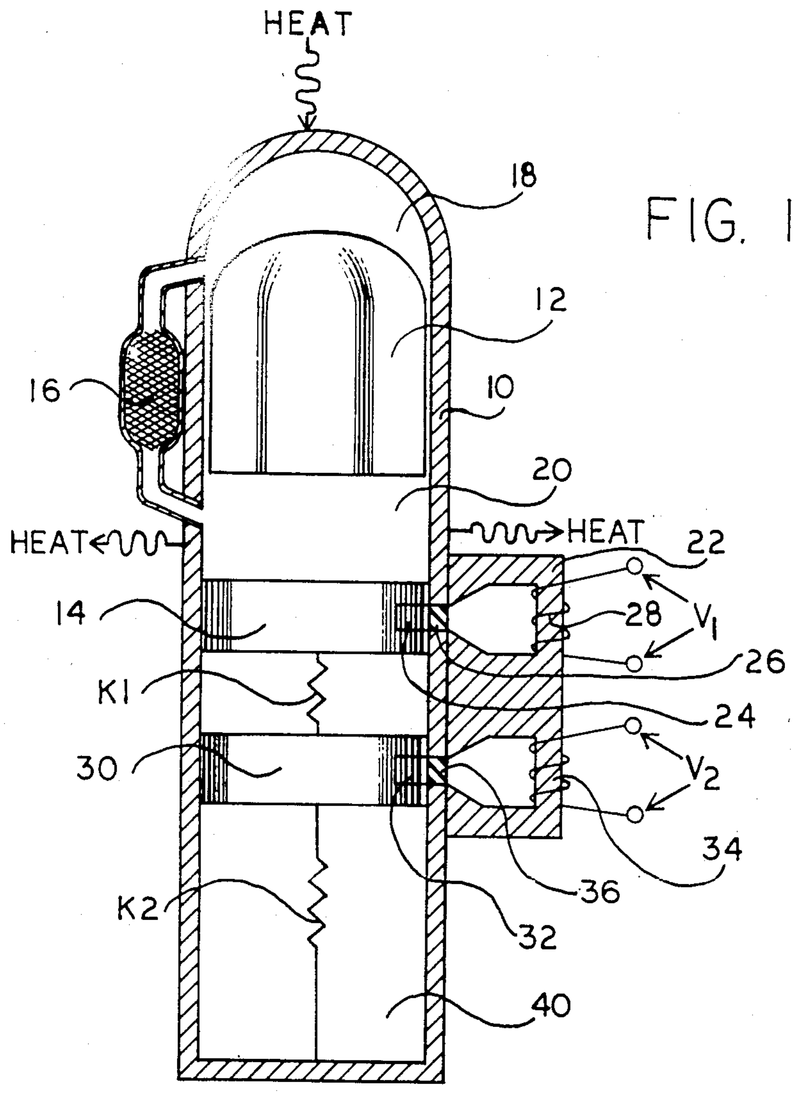
FIG. 1 is a diagrammatic view illustrating a two phase linear alternator embodying the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other circuit elements where such connection is recognized as being equivalent by those skilled in the art.

DETAILED DESCRIPTION

FIG. 1 illustrates a free piston Stirling engine having a cylinder 10 in which a displacer 12 is reciprocatingly mounted. It has a power piston 14, a regenerator 16, together with an expansion space 18 and a compression space 20.

The electrical energy generating alternator has a first armature coil member 22 and a first magnetic flux source 24 in the form of a permanent magnet which is mounted to the piston 14. The flux source 24 is magnetically linked to and relatively reciprocatable with respect to the first armature coil member 22 to generate electrical energy at a voltage V1 in accordance with conventional electromechanical generating principles. Of course, a gap 26 of nonferromagnetic material must exist between the two pole pieces so that the flux reversal through the coil 28 may be accomplished in the conventional manner.

In addition, a body 30 is also mounted in the cylinder 10 for reciprocation within the cylinder 10. The body 30 is drivingly linked through a spring K1 to the power piston 14 for being driven by the piston 14. The spring K1 can be any conventional type of spring including a helical spring or a gas spring. A gas spring can comprise the gas in the space between the piston 14 and the body 30. A permanent magnet 32 is mounted to the body 30 to provide a second magnetic flux source. A second, cooperating armature coil member 34 is mounted outside the cylinder 10 and disposed opposite to the permanent magnet 32 on the body 30. The permanent magnet 32 is magnetically linked to the coil member 34 and is reciprocatable relative to it to generate electrical energy at a voltage V2. As with the armature coil member 28, a gap 36 is provided between the pole pieces of the armature coil member 34 so that the flux through the armature coil will be reversed as the permanent magnet 32 reciprocates across the gap 36. Preferably the gaps 26 and 36 in the armature coil members 28 and 34 are formed at approximately the mid points of the reciprocation paths of the piston 14 and the body 30.

In designing the apparatus of FIG. 1, the mass of the body 30 and the spring constant of the spring K1 are preferably selected so that the body 30 will reciprocate 90 degrees out of phase with the piston 14. These are designed in accordance with the conventional principles of physics dealing with springs acting upon reciprocating bodies. There may be additional springs, such as the spring illustrated diagrammatically as K2, which apply a force against the body 30. They may be due, for example, to the bounce space 40 or to a mechanical or gas spring or combinations of the various types of springs which provide an additional net spring effect acting upon the body 30.

Figure 2:
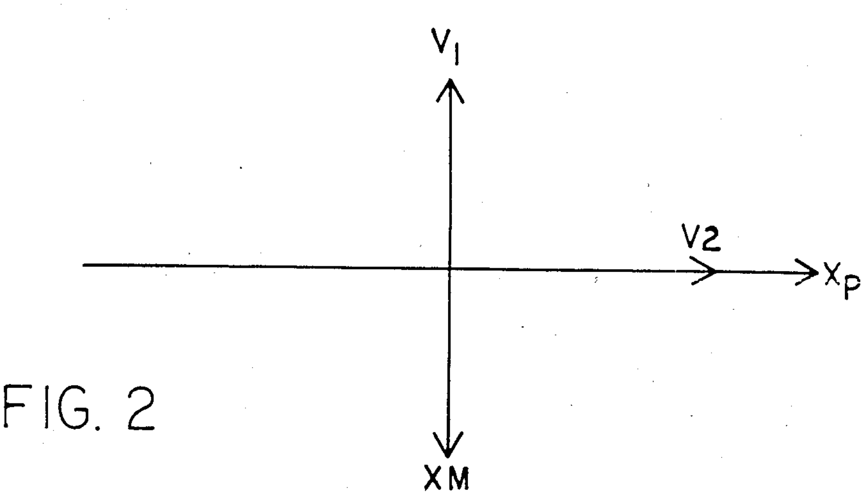
FIG. 2 is a phasor diagram illustrating the phase relationships of the piston body and two voltage outputs of the embodiment of FIG. 1.

FIG. 2 is a phasor diagram illustrating the operation of the embodiment of FIG. 1. The phasor Xp represents the position of the piston 14. Leading the piston phasor Xp by 90 degrees is the phaser V1 representing the voltage V1 at the armature coil member 28. Similarly, the phasor Xm representing the position of the body 30 lags the piston phasor Xp by 90 degrees and the voltage which its magnet 32 induces in the armature coil member 34 is the voltage V2 represented by the phasor V2 in FIG. 2. Thus, the reciprocating oscillating piston 14 and body 30 oscillate in quadrature and therefore produce quadrature voltages V1 and V2.

The quadrature voltages V1 and V2 may be used as two phase power or attached to conventional circuitry and used in any other conventional manner. However, another feature of the present invention is that the armature coils may be connected so that balanced, three phase may be obtained from the armature coil members by inserting a tap between the end of each coil and then connecting the coil in a T, with one coil having its tap connected to ground and its end connected to the tap of the other coil member.

Figure 3:
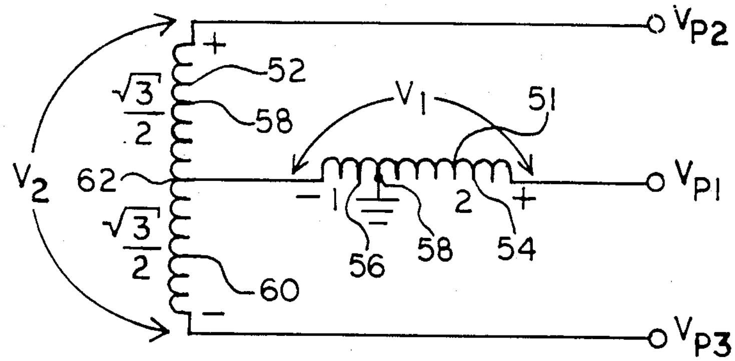
FIG. 3 is a schematic diagram of an embodiment of the invention of the type illustrated in FIG. 1, but having center tap connections to provide the three phase output power from the two windings.

FIG. 3 illustrates the electrical connections of the coils 51 and 52 of both armature coil means 22 and 34 when they are provided with taps to generate balanced three phase electrical power. The coil 51 is divided into a longer end 54 and a shorter end 56 by the tap 58. Similarly, the coil 52 is divided into two equal portions 58 and 60 by a center tap 62.

The tap 58 is connected to ground or common and the three phase power is available at the terminals Vp2, Vp1 and Vp3. In order that the voltages at Vp1, Vp2 and Vp3 will be balanced, that is of equal amplitude and each being 120 degrees out of phase with the other two, the effective turns ratios of the above described portions of the coils are as illustrated on FIG. 3. The off center tap 58 is positioned so that one-third of the turns of the coil 51 are on its short end 56 and two-thirds of the turns are at its long end 54. Similarly, while the center tap 62 divides the coil 52 into two equal portions the 58 and 50, it is also desirable that each of these halves of coil 52 also are related to the coil 51 by the proportionality factor square root of 3/2 as shown on the drawing.

This means that the ratio of the voltage V2 across coil 52 to the voltage V1 across the coil 51 is given by the following relationship.

$$\frac{|V_2|}{|V_1|} = \frac{2}{\sqrt{3}}$$

As is known to those skilled in the art and as described more fully in copending application Ser. No. 766,491 directed to an adaptive regulator for a linear alternator driven by a free piston Stirling engine, the voltage induced across the coil of a linear alternator is proportional to the product of stroke amplitude multiplied by the number of coil turns. Thus, if the stroke amplitude of the power piston 14 is identical to the stroke amplitude of the body 30 and if the magnets 24 and 32 are identical then the voltage ratios will be the turns ratio for all the coils. Of course, the mass of the body 30 and the spring constants of the springs linked to it can be selected so that the amplitude of the stroke of the body 30 and the amplitude of the stroke of the piston 14 are different. Therefore, in that case the number of turns of the coils will also inversely, proportionally change. The net result can be varied in accordance with conventional principles to obtain the voltage ratios illustrated in the drawings.

Figure 4:
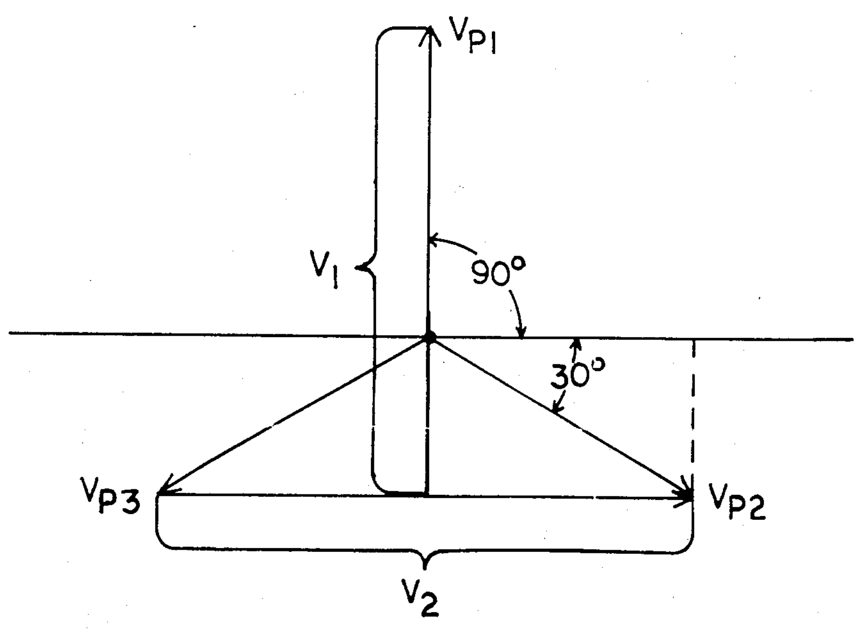
FIG. 4 is a phasor diagram illustrating the relative amplitude and phase of the voltages of the circuit illustrated in FIG. 3.

FIG. 4 illustates a phasor diagram for the circuit of FIG. 3 with the turns ratio selected in accordance with the above principles to qive the desired coil voltages. The balanced three phase voltages Vp1, Vp2 and Vp3 are illustrated along with phasors representing the armature coil voltages V1 and V2. However, in FIG. 4 all the phasors, including the phasors for V1 and V2, are illustrated with respect to the off center tap 58 of FIG. 3.

As with all linear alternators driven by a free piston Stirling engine, a regulation system is needed in order to maintain a constant voltage. The preferred regulator is illustrated in above cited copending application. The voltage may be maintained essentially constant by providing a controllable load in shunt with the useful load which is connected to the three phase circuit. A feedback control system is provided to sense the output voltage and vary the conductance of the shunt load in inverse proportion to changes in the output voltage. By using a high gain amplifier in the feedback control system in the conventional manner, small variations in output voltage will cause relatively larger variations in shunt load conductance. The current is varied through the shunt conductance. In this manner, total armature output current is maintained essentially constant by sinking through the controllable shunt conductance whatever portion of the constant power output that does not flow through the useful load. That results in maintenance of the output voltage at a relatively constant level. Of course, other conventional means can be used for regulating the voltage and for maintaining the power piston stroke relatively constant. Control of the voltage is important and has the desirable result of maintaining the piston stroke eventually constant so that neither the piston 14 nor the body 30 will increase their amplitudes of reciprocation sufficiently to cause damage or destruction.

While certain preferred embodiments of the present invention have been disclosed in detail, it is to be understood that various modifications may be adopted without departing from the spirit of the invention or scope of the following claims.

We claim:

1. An improved AC electrical power generating source of the type wherein a free piston Stirling engine drive a linear alternator via a power piston, the linear alternator having a first armature coil member and a first magnetic flux source member magnetically linked to and relatively reciprocable with respect to the first coil member, one of said members being drivingly linked to the power piston of the engine, wherein the improvement provides multi-phase output power and comprises:

a body mounted for reciprocation and drivingly linked through a spring to be driven by the power piston, and a second armature coil member and a second, cooperating magnetic flux source member magnetically linked to and relatively reciprocatable with respect to the second coil member, one of said second members being drivingly linked to said body.

2. An apparatus in accordance with claim 1 wherein said first magnetic flux source is a permanent magnet mounted to the power piston and the second magnetic flux source is a permanent magnet mounted to the body.

3. An apparatus in accordance with claim 2 wherein the power piston and the body are both reciprocatable in the same cylinder, wherein a portion of the cylinder at the mid points of the reciprocation of the power piston and of the body is non-ferromagnetic and wherein both of said armatures are formed outside of the cylinder at said mid points.

4. An apparatus in accordance with claim 3 wherein the mass of said body and the spring constant of said spring is selected so that said body will reciprocate 90 degrees out of phase with said power piston.

5. An apparatus in accordance with claim 4 wherein said spring is a gas spring.

6. An apparatus in accordance with claim 1 wherein each of said armature coil members have a tap between their ends and wherein said coils are connected in a Tee with one coil member having its tap connected to ground and its end connected to the tap of the other coil member.

7. An apparatus in accordance with claim 2 wherein one of said armature coil members has a center tap and the other armature coil member has an off center tap with one-third of its turns on its short end and two-thirds of its turns on its long end, the extreme end of said short end connected to said center tap, said off center tap being a ground and three phase output being available at the other three extreme ends of said coil members.

8. An apparatus in accordance with claim 7 wherein the ratio of the voltage induced in the center tapped coil member to the voltage induced in the other coil member is $2/\sqrt{3}$ to 1.

9. An apparatus in accordance with claim 8 wherein the power piston and the body are both reciprocatable in the same cylinder, wherein a portion of the cylinder at the mid points of the reciprocation of the power piston and of the body is non-ferromagnetic and wherein both of said armatures are formed outside of the cylinder at said mid points.

10. An apparatus in accordance with claim 9 wherein the mass of said body and the spring constant of said spring is selected so that said body will reciprocate 90 degrees out of phase with said power piston.

11. An apparatus in accordance with claim 10 wherein said spring is a gas spring.

* * * * *